United States Patent [19]

Coates et al.

[11] Patent Number: 4,826,321

[45] Date of Patent: May 2, 1989

[54] THIN DIELECTRIC FILM MEASURING SYSTEM

[75] Inventors: Vincent J. Coates, Palo Alto; Warren W. Lin, Fremont, both of Calif.

[73] Assignee: Nanometrics, Incorporated, Sunnyvale, Calif.

[21] Appl. No.: 167,692

[22] Filed: Mar. 14, 1988

[51] Int. Cl.$^4$ .............................................. G01B 9/02
[52] U.S. Cl. .................................. 356/351; 356/357; 356/369
[58] Field of Search ................ 356/357, 361, 369, 351

[56] References Cited

U.S. PATENT DOCUMENTS

| | | | |
|---|---|---|---|
| 3,985,447 | 10/1976 | Aspnes | 356/118 |
| 4,105,338 | 8/1978 | Kuroha | 356/118 |
| 4,606,641 | 8/1986 | Yamada | 356/369 |
| 4,672,196 | 6/1987 | Canino | 250/225 |

OTHER PUBLICATIONS

Pliskin et al., "Simple Technique For Very Thin SiO$_2$ Film Thickness Measurements", *Applied Physics Letters*, vol. 11, No. 8, pp. 252-259, 10/67.

Primary Examiner—Davis L. Willis
Assistant Examiner—Matthew W. Koren
Attorney, Agent, or Firm—Linval B. Castle

[57] ABSTRACT

A system for the precise measurement of thin dielectric films on a substrate by directing a plane polarized laser light beam to the film at the Brewster angle of the substrate and by measuring the intensity changes between a measurement from the substrate alone and from the film coated substrate. Accurate thin film measurements in the range of from about 10 to 1,500 Angstroms are possible.

10 Claims, 2 Drawing Sheets

THIN DIELECTRIC FILM MEASURING SYSTEM

BACKGROUND OF THE INVENTION

This invention relates generally to the measurement of very thin dielectric films adhering to a substrate material and more particularly to a measuring system which measures the variation in a polarized light beam caused by the influence of the thickness of an adhering thin film in relation to the Brewster angle of the substrate material.

Systems presently exist that are capable of measuring the depth of films having a thickness of approximately two hundred Angstroms and greater. Nanometrics Incorporated of Sunnyvale, Calif., has developed measuring equipment such as its NanoSpec Automatic Film Thickness (AFT) system and various manufacturers produce the well known ellipsometer. These two systems are suitable for determining the thickness of thicker films. Ellipsometers are capable of measuring very thin films down to about 10 Angstroms, but such ellipsometers are very costly, the process is very slow, and very complex mathematics are involved. The stringent specifications of the present day electronic industry require reasonably priced instruments that will rapidly and accurately measure film thicknesses down to about 20 Angstroms. This need has remained unsatisfied until the conception of the invention described herein.

BRIEF SUMMARY OF THE INVENTION

A key advantage offered by this invention is that it can be used to determine the thickness of thin films in the range of approximately ten (10) Angstroms to about fifteen hundred (1500) Angstroms or higher Briefly summarized, the invention defined by the appended claims provides a system for determining the thickness of a thin dielectric film on a substrate or base. A horizontally polarized laser beam is reflected from the surface of the substrate at the predetermined Brewster angle of the substrate material and an output measurement is made of the reflected beam to provide a value representing no film or a film of "zero" thickness. This value, which may be termed an offset value, is one of two measurements taken to calibrate the system, the second calibration measurement being made from the beam reflected from the surface of a thin film of known thickness adhering to a similar substrate having the same Brewster angle. Once calibrated, the system may be used to continuously measure thin films of unknown thickness to an accuracy of about 2 Angstroms until the system is shut down.

Either of two methods may be used to measure the beam reflected from the specimen surface. One system measures the apparent Brewster angle reflected from the surface. This is the actual Brewster angle of the base material varied by the thickness and refraction index of the overlying thin film. A second method measures the intensity of the reflected beam; this second method is preferred, primarily because this system is simpler, requires minimum precision, and has no costly moving parts.

The invention includes additional features such as a means for reducing stray light from impinging on the beam detector, a means for compensating for possible reflected beam displacements that cause variations in the sensitivity of the detector, and means for compensating for power fluctuations in the laser beam.

Other features of the invention are further defined in the claims. However, as an illustration of the structure and operation of specific hardware for implementing the invention, reference is to be made to the detailed description.

BRIEF DESCRIPTION OF THE DRAWINGS

In the drawings which illustrate the preferred embodiment of the invention.

DETAILED DESCRIPTION

Figure 1:
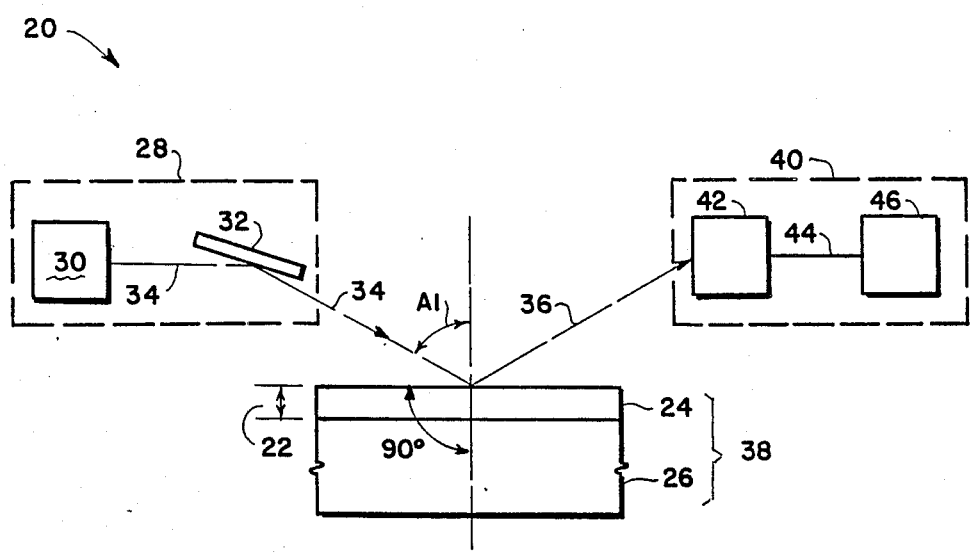
FIG. 1 is a schematic block diagram showing one example of the construction of the thin dielectric film measuring system.
Figure 2A:
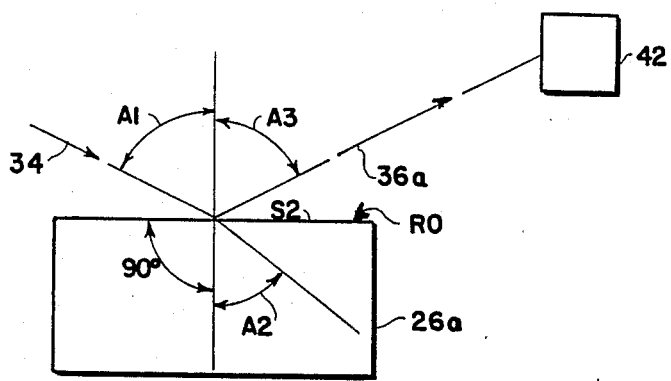
FIG. 2A is a schematic diagram illustrating the angles of incidence and reflectance of a polarized beam incident to a base material at the predetermined Brewster angle of the material.
Figure 2B:
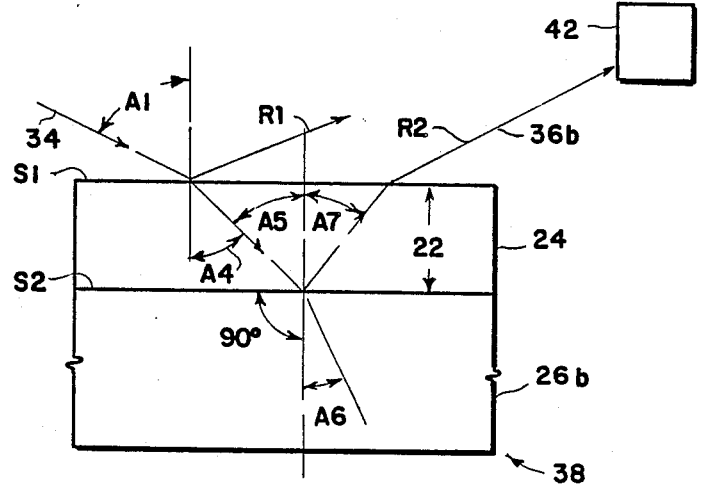
FIG. 2B is a schematic diagram illustrating the various angles of incidence, refraction and reflection of a beam incident to a thin dielectric film on a substrate.

FIGS. 1, 2A and 2B illustrate an example overview of the invention when broadly defined.

This invention provides a system 20 including both apparatus and method for determining an unknown thickness 22 (also referred to as thickness T) of a thin dielectric film 24 on a substrate or base 26. We define a dielectric film as one being formed of any material other than absorptive materials or metals.

FIG. 1 shows that the system apparatus includes a first means 28, such as a laser 30 and a mirror 32, for delivering a beam 34 of plane polarized laser light at a constant intensity and at a predetermined angle, A1, to the surface of a sandwich 38 comprising a thin film 24 adhering to the surface of a substrate or base 26. The beam 36 reflected from the surface is directed to a second means 40 including a detector 42 which may be a PIN diode and which generates an output signal 44 corresponding to the intensity of the detected beam 36 and passes the output signal to a computer 46.

When the plane polarized light at the Brewster angle is reflected from only a substrate surface, its reflected beam intensity measured by a detector differs from the same incident beam when reflected from the same substrate with an overlying transparent film. It is that difference which is measured to determine thin film thickness.

To first calibrate the system, the incident beam 34 of FIG. 2A is delivered to the base 26a at the predetermined Brewster angle, A1, of the base material. The base 26a then optically interacts with beam 34 to produce a reflected beam 36a. An intensity measurement is made of the reflected beam 36a; the resulting value may be termed the "offset value", representing an absence of thin film or a film of zero thickness. This may also be considered to represent the points, R=0, T=0, on a calibration curve to be later discussed. This offset value is stored and is later used to subtract from all measured values for the accurate determination of film thickness.

To continue the calibration, the incident beam 34 of FIG. 2B is delivered to a sandwich 38 formed by the application of a thin film 24 of a predetermined known thickness on a identical base 26b. The sandwich 38 optically interacts with the incident beam 34 so that the beam is reflected as beam 36b with an intensity characteristic which differs from the intensity measurement made of the reflected beam from the substrate alone. Measurements of beam intensity made from this film of known thickness provide a second point on the previously mentioned calibration curve and measurements from this reference film are used for mathematically normalizing all future measured values of unknown film thicknesses.

FIG. 1 also shows that the system 20 further includes a second means 40 such as a detector 42 which may be, for example, a PIN diode detector. Detector 42 is coupled to produce and deliver a signal 44 of a detected beam 36 to a computer 46 which determines the unknown film thickness from previously stored data on the measurements from only the substrate, from the film of known thickness, and from the thin film equations to be later discussed.

Discussed below are additional examples of structure and operation that further illustrate particular ways for implementing the invention defined by the claims.

FIGS. 1, 2A and 2B illustrate the techniques for determining the unknown thickness 22 of a film 24 by means of (a) the beam intensity and (b) the polarization angle, also known as the Brewster angle.

FIG. 2A illustrates the incidence and reflectance angles from the surface of a substrate or base 26a. FIG. 2B is an enlarged partial view of FIG. 1 showing the various angles of incidence, refraction and reflection of the beam 34 as it impacts base 26b and sandwich 38 made up of film 24 and base 26b. As is the convention in optics, all angles are measured from a vertical line normal to the surface impacted by a light beam.

FIG. 2A shows calibration base 26a when interacting with beam 34. Beam 34 passes through air having an index of refraction, $N(0)=1$, and hits the surface of a calibration base 26a at an angle of incidence A1; this top surface S2 has a reflectivity R0. The base has an index of refraction $N(2)$ causing the beam to change its path of travel to match an angle of refraction A2. From top surface S2, beam 34 is reflected at a reflection angle A3 at least in part as reflected beam 36a which is received by detector 42.

FIG. 2B shows sandwich 38, made up of film 24 overlying base 26b. Beam 34 passes through air, $N(0)=1$, and first hits film 24 at a top surface S1, having a reflectivity R1, at an incidence angle A1, the same angle as A1 for base 26a in the preceeding paragraph. Angle A1 is held constant the Brewster angle of the base 26a material; for a silicon substrate, this angle is 75.55°. The film has an index of refraction $N(1)$ causing the beam to change its path of travel to match an angle of refraction A4. From the top surface S2 of base 26b, a beam is reflected at a reflection angle A7 at least in part as reflected beam 36b which is received by detector 42.

Detector 42 senses the reflected beam 36b, generates a corresponding output signal and forwards that signal to the computer 46 for further analysis using, where appropriate, the following equations:

$$R = [R1^2 + R2^2 + 2(R1R2 \cos X)] / [1 + (R1^2 \times R2^2) + 2(R1R2 \cos X)] \quad (1)$$

Where
R = reflectivity or reflected energy
R1 = Tan (A1-A4)/Tan (A1+A4) = Reflectivity of surface S1

R2 = Tan (A4-A6)/Tan (A4+A6) = Reflectivity of surface S2
$X = 2 \times 360° \times N1 \times T \times \cos A4 / 6328$
T = thin film thickness in Angstroms
(The term 6328 is the wavelength in Angstroms of the laser 30 in the preferred embodiment)

Brewster's Law states that light will receive maximum polarization from a reflecting surface when the light is incident to the surface at an angle (i.e., the Brewster Angle, or angle of polarization) having a tangent equal to the Index of Refraction of the surface. Mathematically expressed, the Brewster Angle is that angle, A(B) which satisfies the following Equation (2):

$$\text{Tan } A(B) = \sin Y / \sin Z \quad (2)$$

where
Y = the angle of incidence of light passing through a material having an index of refraction $N(Y)$; and
Z = the angle of incidence of light passing through a material having an index of refraction $N(Z)$.

$$N = \sin Y / \sin Z \quad (3)$$

where N = the relative index of refraction.

In the electronics industry, thin films are generally deposited on a thin wafer or base 26 of silicon. Applying Brewster's Law to silicon, Tan $A(B)=4$, so $A(B)=75°$ (approximately).

In Equation (1), the special situation exists whereby the angles A1 and A2 relate such that $(A1+A2)=90°$ when light is incident to the Brewster angle with respect to surface S2 of the base when a film overlies the base. R2 will always equal $-R1$, but when the film is absent and base alone is measured, then $R=0$, ($T=0$ and $\cos X=1$).

The computer 46 is used to store the value of the beam intensity from the base alone and to subtract this offset value from all subsequent measured values; it calculates the reflectance, R, of the film of known thickness, T, from the above equations, and then determines the unknown values of thickness, T, in all subsequent measurements of films. If desired a calibration curve may be developed, plotting values of R vs. T. Such a calibration curve shows that the relation between R and T is substantially linear between thickness of from about 10 to about 1,400 Angstroms indicating that, within these values, the measurement system is highly accurate.

Figure 3:
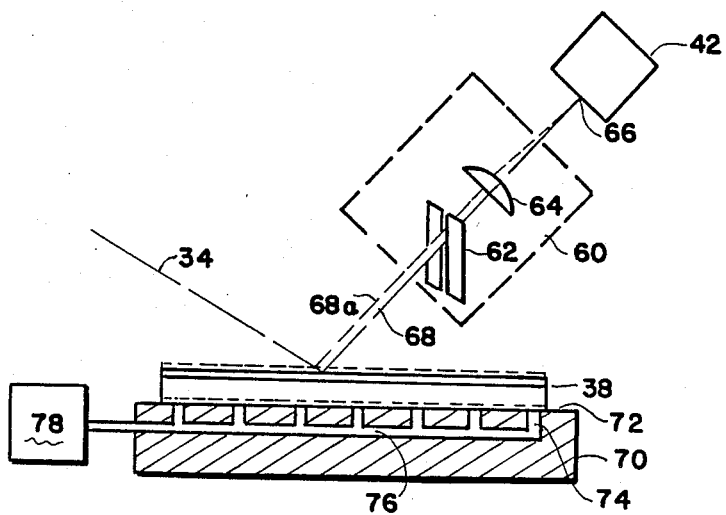
FIG. 3 is a schematic block diagram showing a slitted shield for reducing stray light from the detector and a lens for directing displaced reflected light beams into the detector.

FIG. 3 shows the use of additional apparatus for stabilizing sensitivity variations of the detector 42.

FIG. 3 illustrates a third means 60 comprising a slit 62 cooperating with an aspherical plane convex lens 64 for reducing stray light from striking the detector and for focusing a possibly displaced reflected beam on the sensitive surface 66 of the detector 42. Such stabilization is useful because the beam 34 often will be reflected as, for example, an undesirably reflected beam 68a caused by variations in the height of the surface of the film.

Securing devices such as a vacuum vise 70 are widely used during fabrication of semiconductor wafers such as that typified by the sandwich 38. Vise 70 has an upper surface penetrated by a plurality of conduits 74 coupled through a pipe 76 to a vacuum pump 78. During operation, sandwich 38 is placed onto surface 72 and pump 78 is activated to create a vacuum which draws sandwich 38 evenly flat against surface 72. However, sandwich 38 may not always be held flat; sometimes it is held irregularly or lies on some type of film that elevates it slightly above the surface 72. Any changes in elevation of the top surface of the overlying film will result in a displaced reflected beam 68a and such a displacement is concentrated into the center of detector 42 by the lens 64.

Figure 4:
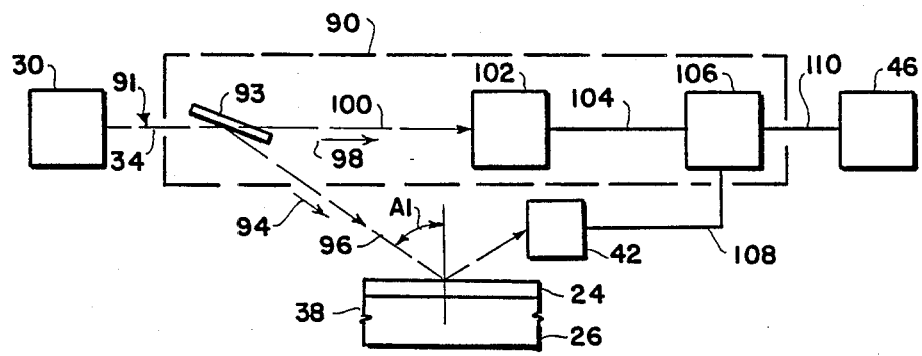
FIG. 4 is a schematic block diagram showing circuitry for compensating for laser power fluctuations.

FIG. 4 illustrates circuitry and apparatus for compensating for power fluctuations in the output of the laser 30.

The apparatus of FIG. 4 comprises a fourth means 90 including a beam splitter 93 positioned to pass in a first direction 94 a large portion (about 90%) of the total laser output power 91 toward the sandwich 38, and to pass in a second direction 98 a small power portion 100 (about 10%) of the total output power 91.

Fourth means 90 further includes a reference detector 102 positioned to receive the small power portion 100 and to develop therefrom a first signal 104 representing the small power portion.

Fourth means 90 further includes a signal comparitor and divider 106 which receives the first signal 104 from the reference detector 102 and a signal 108 representing the larger power portion from detector 42 The circuit 106 then functions as a signal divider for comparing the first signal 104 and second signal 108 and, in response thereto, generates a stabilized output 110 of total signal which is delivered to the computer 46. Thus, beam splitter 93, reference detector 102, signal detector 42 and divider 106 in combination form a servo loop. The beneficial result of the foregoing is that fluctuations in the raw laser output, ranging around 5% to 6%, appear to be reduced to fluctuations of only about 0.5%.

We claim:

1. An apparatus for determining the thickness of a thin dielectric film on the surface of a base, the material of said base having a predetermined Brewster angle at a known wavelength of incident light, said apparatus comprising:
    first means for delivering a collimated beam of plane polarized monochromatic light at the known wavelength at the Brewster angle of the base material to:
    the surface of a base material having the predetermined Brewster angle, said beam being reflected from said surface with a first detected intensity amplitude representing an offset value of the apparatus; and
    a sandwich formed of the thin film on the surface of a base material having an identical predetermined Brewster angle, said beam being reflected from the sandwich at a second detected intensity amplitude; and
    second means responsive to the difference between said first detected intensity amplitude and said second detected intensity amplitude for determining the thickness of said thin film.

2. The apparatus claimed in claim 1 wherein said plane polarized monochromatic light is generated by a laser.

3. The apparatus claimed in claim 1 wherein said second means includes a detector and computer, said computer being responsive to the output signal from said detector for comparing the second detected intensity amplitude measurement of a thin film of known thickness with the second detected intensity amplitude measurement of a thin film of unknown thickness for determining said unknown thickness.

4. The apparatus claimed in claim 1 further including third means for stabilizing at least one variation in the sensitivity of a detector in said second means.

5. The apparatus claimed in claim 4 wherein said third means includes a lens in the optical path of the reflected beam to said detector, said lens positioned to intercept displaced reflected beams and to focus said displaced beams into said detector.

6. The apparatus claimed in claim 1 further including fourth means for compensating for fluctuations in the output power of said monochromatic light.

7. The apparatus claimed in claim 6 wherein said fourth means includes:
    a beam splitter formed to pass a large power portion of said output power toward a surface to be reflected therefrom and detected, and a small power portion of said output power in a second direction;
    a reference detector positioned to receive said small power portion and to develop a first signal representative of said small power portion; and
    a signal detector positioned for receiving said first signal and for receiving from said second means a second signal representative of said large power portion, said signal detector functioning to compare said first and said second signal and, in response thereto, to generate a stabilized output signal representing the total power which is delivered to said computer, whereby said beam splitter, said reference detector and said signal detector in combination for a servo loop.

8. A method for determining an unknown thickness of a thin dielectric film on a substrate surface, said method comprising the steps of:
    delivering a collimated beam of a plane polarized laser light to the surface of an uncoated substrate material at an angle of incidence at the Brewster angle of the substrate material and measuring the intensity of the light beam reflected from said surface to obtain a first calibration value of a film of "zero" thickness representing an offset value of the measuring system;
    delivering said beam of light at the same Brewster angle to the surface of an identical substrate material coated with a thin film of known thickness and measuring the reflected light beam intensity to obtain a second calibration value representing a film of known thickness and a normalizing calibration of said system; and
    delivering said beam of light at said same angle to the surface of an identical substrate material coated with a thin film of unknown thickness and measuring the reflected light beam intensity to obtain a value representing the known thickness, said unknown thickness being determinable from known values of wavelength of incident light, refractive indices of the substrate and thin film materials, Brewster angle, and measured values of reflected light intensity corrected by said first and second calibration values.

9. The method claimed in claim 8 further including the step of stabilizing the detected reflected light beam intensity by the steps of:
    sampling a portion of the laser light beam by passing said beam from said laser through a beam splitter;
    detecting said sampled portion and generating a corresponding first signal proportional to its intensity;

detecting the light beam reflected from the surface of a specimen and generating a second signal proportional to its intensity; and stabilizing the amplitude of said second signal by dividing it by a control signal proportional to variations contained in said first signal.

10. A thin film measuring system for determining the thickness of a thin dielectric film on the surface of a base material having a known refractive index and known Brewster angle at a known wavelength of incident light, said measuring system comprising:

means for delivering an incident collimated beam of plane polarized monochromatic light at the known wavelength to the surface of the thin film at the known Brewster angle of the uncoated base material;

detecting means for measuring the intensity of said beam after its reflection from said surface; and computing means coupled to said detecting means for computing from said intensity measurement the thickness of said thin film, said computing means having stored therein values representing said known wavelength of incident light, said known refractive index, said known Brewster angle, and predetermined offset and normalizing correction values obtained from prior measurements of known film thickness values on identical base material and made with identical incident light.

* * * * *